Sept. 30, 1969   H. H. ANDREWS   3,469,290

PLASTIC SNAP FASTENER

Filed Dec. 8, 1967

INVENTOR
Hugh H. Andrews
BY Dallett Hoopes
ATTORNEY

United States Patent Office

3,469,290
Patented Sept. 30, 1969

---

3,469,290
PLASTIC SNAP FASTENER
Hugh Hill Andrews, Cheshire, Conn., assignor to Scovill Manufacturing Company, Waterbury, Conn., a corporation of Connecticut
Filed Dec. 8, 1967, Ser. No. 689,081
Int. Cl. A44b *17/00*
U.S. Cl. 24—208                   1 Claim

ABSTRACT OF THE DISCLOSURE

In the attachment of a plastic snap fastener element, a series of nibs project from the gripping face of a fastener element base to cooperate with a single large radiused groove in a post element base, to prevent turning of the fastener and to align the bases, as well as preventing sidewise pullout of a piece of fabric gripped between such bases.

---

This invention relates to all plastic snap fasteners and is an improvement on the fastener disclosed in the patent to Huelster et al., 3,107,408.

One of the objects of the invention is to provide means on the gripping faces of the fastener element base and the post base which will prevent relative turning of the fastener element on the fabric; which will avoid any weakening of the fastener element base; and which will lead the post into better alignment with the fastener element base especially in the event of some eccentricity of the post stem, or of the hole in the fastener element which receives the post stem. It has been found in practice that it is important to maintain the base of the fastener element rigid because any bending of such base tends to react on the socket or stud flanges and affect the action of the fastener, and my improved construction has no groove which would weaken them.

Other objects and advantages will hereinafter more fully appear. In the accompanying drawings, I have shown for purpose of illustration, one embodiment which the invention may assume in practice.

Figure 1:
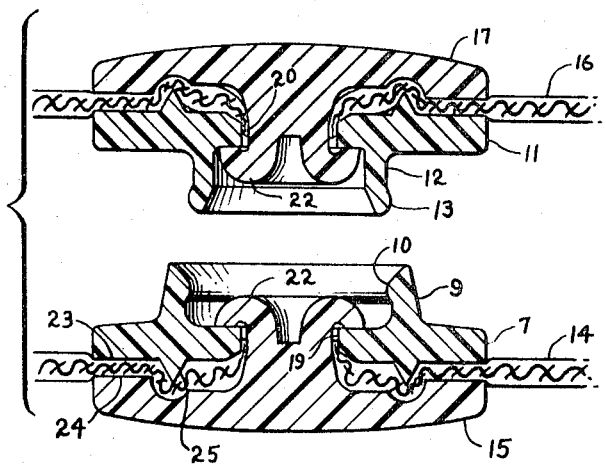
FIG. 1 is a central section showing stud and socket units assembled to fabric.
Figure 4:
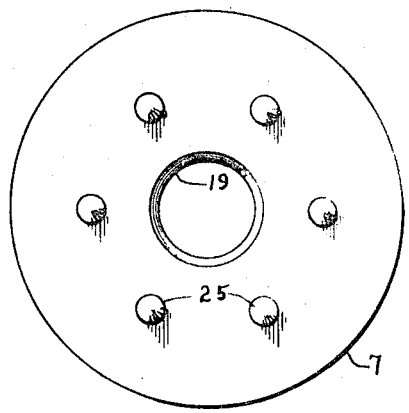
FIG. 4 is a top plan view of the stud element as seen in FIG. 2 which is essentially the same as a bottom plan view of the socket element.
Figure 2:
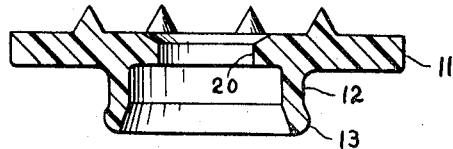
FIG. 2 is a central section through the stud element.
Figure 5:
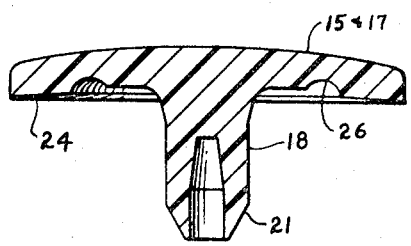
FIG. 5 shows the post in central section before the attaching operation.
Figure 3:
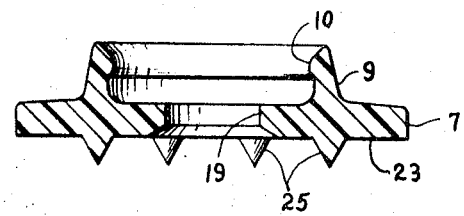
FIG. 3 is a central section through the socket element.

The socket element has a rigid circular base 7 with a circular flange 9 having a constricted entrance opening 10. The stud element also has a rigid circular base 11 with a circular flange 12 having a flared, rounded end 13 which is slightly larger in external diameter than the entrance opening 10 of the socket so as to have snap engagement with it in the usual way. The socket element is secured to a piece of fabric 14 by a post generally designated 15, and the stud is secured to a similar piece of fabric 16 by a like post 17. The stem 18 of each post extends through a central aperture in the fastener element, which is designated 19 for the socket and 20 for the stud. The stem of the post has a solid portion adjacent the base, and a hollow tapered portion 21 which is riveted over against the inner side of the socket and stud as indicated by the numeral 22.

The improvement is substantially the same in the case of both the socket and stud, and can be described by reference only to the socket. The base 7 and the circular base of the post have gripping faces 23 and 24 respectively engaging opposite sides of the fabric 14. Projecting from the gripping face 23 is a series of nibs 25 arranged in a circular fashion around the aperture 19. The gripping face 24 of the post has a comparatively large radiused groove 26 adapted to align with the nibs 25. It will be noted that the nibs 25 and groove 26 are set well back from the outer edges of the fastener element and post, and preferably about halfway between the edge of the post or fastener element base and the stem or aperture as the case may be. This gives a strong grip on the fabric while minimizing the tendency to bend the bases of either the fastener element or post. If the stem of the post or the aperture in the fastener element is slightly off center, the nibs, being pointed, will be led into the comparatively larger groove 26 so as to make for better alignment of the post with the fastener element. The nibs 25, of course, do not weaken the fastener element as would one or more grooves, and thus the tendency for the interlocking portions, namely, the flanges 9 and 12 to change dimension, is eliminated. It will be also evident that the nibs will bite into the fabric so as to prevent any twisting or turning of the fastener elements.

I claim:

In a snap fastener unit consisting of:
(a) a fastener element of plastic material with a base having a central aperture therethrough and an upstanding circular flange around the aperture adapted for snap engagement with a mating fastener element and;
(b) a post member having a base substantially coextensive with the base of the fastener element and a stem adapted to extend through a piece of flexible support material, through said aperture in the fastener element and be riveted over inside said circular flange to cause such flexible support material to be clamped between opposed gripping faces of said bases;
(c) the improvement which consists of a series of spaced apart nibs projecting from the gripping face of said fastener element, said nibs being in a circular arrangement, and a single relatively large radiused circular groove in the gripping face of said post base aligned with and adapted to receive the pointed ends of said nibs, in which said nibs are located approximately midway between said aperture and the outer edge of said fastener element base and said groove is located approximately midway between said stem and the outer edge of said post base.

References Cited

UNITED STATES PATENTS

| 2,502,034 | 3/1950 | Bowie | 24—108 |
| 1,489,777 | 4/1924 | Merzinger | 24—108 |
| 1,646,053 | 10/1927 | Clark | 24—95 |
| 1,887,466 | 11/1932 | Puc | 24—218 |
| 2,548,004 | 4/1951 | Duefrene | 24—208 |
| 3,107,408 | 10/1963 | Huelster et al. | 24—208 |

FOREIGN PATENTS

| 704,837 | 2/1931 | France. |

DONALD A. GRIFFIN, Primary Examiner